United States Patent
Jasper et al.

(10) Patent No.: US 7,249,312 B2
(45) Date of Patent: Jul. 24, 2007

(54) ATTRIBUTE SCORING FOR UNSTRUCTURED CONTENT

(75) Inventors: Robert Joseph Jasper, Sammamish, WA (US); Michael M. Meyer, Seattle, WA (US); Kelly Pennock, Bothell, WA (US)

(73) Assignee: Intelligent Results, Bellevue, WA (US)

( * ) Notice: Subject to any disclaimer, the term of this patent is extended or adjusted under 35 U.S.C. 154(b) by 512 days.

(21) Appl. No.: 10/241,982

(22) Filed: Sep. 11, 2002

(65) Prior Publication Data

US 2004/0049478 A1   Mar. 11, 2004

(51) Int. Cl.
*G06F 17/00* (2006.01)
*G06F 17/30* (2006.01)

(52) U.S. Cl. .............................. 715/500; 707/3; 707/5; 707/6

(58) Field of Classification Search .................... 707/6, 707/5, 1, 3; 382/159
See application file for complete search history.

(56) References Cited

U.S. PATENT DOCUMENTS

| | | | |
|---|---|---|---|
| 5,197,005 A | 3/1993 | Shwartz et al. | |
| 5,321,833 A | 6/1994 | Chang et al. | |
| 5,371,807 A | 12/1994 | Register et al. | |
| 5,418,948 A | 5/1995 | Turtle | |
| 5,659,731 A | 8/1997 | Gustafson | |
| 5,694,559 A | 12/1997 | Hobson et al. | |
| 5,799,268 A | 8/1998 | Boguraev | |
| 5,905,980 A | 5/1999 | Masuichi et al. | |
| 5,974,415 A | 10/1999 | Schreiber | |
| 6,006,225 A | 12/1999 | Bowman et al. | |
| 6,012,053 A | 1/2000 | Pant et al. | |
| 6,070,169 A | 5/2000 | Shorter | |
| 6,073,130 A | 6/2000 | Jacobson et al. | |
| 6,167,397 A * | 12/2000 | Jacobson et al. | 707/5 |
| 6,175,843 B1 | 1/2001 | Muramoto et al. | |
| 6,212,528 B1 | 4/2001 | Brophy et al. | |
| 6,216,123 B1 | 4/2001 | Robertson et al. | |
| 6,240,407 B1 | 5/2001 | Chang et al. | |
| 6,269,364 B1 | 7/2001 | Kennedy et al. | |
| 6,327,589 B1 | 12/2001 | Blewett et al. | |
| 6,356,899 B1 | 3/2002 | Chakrabarti et al. | |
| 7,039,631 B1 * | 5/2006 | Finger, II | 707/3 |
| 2001/0016846 A1 | 8/2001 | Chakrabarti et al. | |

(Continued)

OTHER PUBLICATIONS

Sholom M. Weiss, A system for real-time competitive market intelligence, ACM Press, 2002, pp. 360-365.*

(Continued)

*Primary Examiner*—William Bashore
*Assistant Examiner*—Chau Nguyen
(74) *Attorney, Agent, or Firm*—Fenwick & West LLP (57) ABSTRACT

The present invention provides for a system and method of assigning attribute scores, including those for abstract and diverse concepts such as sentiment (e.g., happiness, anger, sadness) to documents containing unstructured content (natural language content). Such content may include, but is not limited to, Web pages, e-mails, word processing documents, computer logs, chat logs, audio files, graphical images, text files, books, magazines, articles, etc. The attributes that are scored are specialized views of the unstructured content. Accordingly, attribute scoring denotes the processes of assigning one or more new measures to a document containing unstructured content. The attribute score or measure indicates the degree of the attributes found within the document.

19 Claims, 6 Drawing Sheets

U.S. PATENT DOCUMENTS

| | | | |
|---|---|---|---|
| 2002/0032682 A1 | 3/2002 | Kobayashi et al. | |
| 2002/0032772 A1 | 3/2002 | Olstad et al. | |
| 2002/0059228 A1 | 5/2002 | McCall et al. | |
| 2002/0129015 A1* | 9/2002 | Caudill et al. | 707/6 |
| 2004/0078386 A1* | 4/2004 | Moon et al. | 707/102 |
| 2005/0055346 A1* | 3/2005 | Perisic et al. | 707/3 |
| 2006/0143175 A1* | 6/2006 | Ukrainczyk et al. | 707/6 |
| 2006/0184521 A1* | 8/2006 | Ponte | 707/5 |

OTHER PUBLICATIONS

"Verity Search: The Advantages of Advanced Information Retrieval," Nov. 2000, Verity, Inc., 15 pages.

Glover, E.J., et al., "Web Search—Your Way," *Communications of the ACM*, (preprint), pp. 1-9.

Goldman, R., et al., "Proximity Search in Databases," *Proceedings of the 24th VLDB Conference*, New York, 1998, pp. 26-37.

Jónsson, B., et al., "Interaction of Query Evaluation and Buffer Management for Information Retrieval," University of Maryland, AT&T, undated, 12 pages.

Labrinidis, A., et al., "WebView Materialization," *Proceedings of the ACM SIGMOD International Confer4ence on Management of Data*, Dallas, Texas, May 14-19, 2000, pp. 367-378.

Liu, Y.K., et al., "Finding Descriptions or Definitions of Words on the WWW," source: Department of Information Studies, University of Sheffield, Sep. 2000, pp. 1-74.

Mangisengi, O., et al., "A Multidimensional Modeling Approach for OLAP within the Framework of the Relational Model based on Quotient Relations," Institute of Software Technology, Technical University of Vienna, 1999, pp. 40-46.

Natsev, A., et al., "Aggregate Predicate Support in DMBS," IBM Watson Research Center, 30 pages.

Pedersen, T.B., et al., "Extending OLAP Querying To External Object Databases," CIKM, McLean, VA, 2000, pp. 405-413.

Pourabbas, E., et al., "Characterization of Hierarchies and Some Operations in OLAP Environment," Istituto di Analisi dei Sistemi ed Informatica, Rome, Italy, pp. 54-59.

Rizvi, S., "Information Retrieval from Structured and Semi-Structured Databases," Department of Computer Science and Engineering, Indian Institute of Technology, Bombay, 35 pages.

Schwartz, M., et al., (workshop co-chairs), "Distributed Indexing/Searching Workshop," agenda, attendee list, and position papers, World Wide Web Consortium, May 28-29, 1996, pp. 1-87.

Shoshani, A., "OLAP and Statistical Databases: Similarities and Differences," *PODS*, 1997, pp. 185-196.

\* cited by examiner

ATTRIBUTE SCORING FOR UNSTRUCTURED CONTENT

FIELD OF THE INVENTION

The present invention generally relates to information retrieval systems and methods. More specifically, the present invention is directed towards generating a score for a desired attribute for each unstructured document in a corpus of documents.

BACKGROUND OF THE INVENTION

As companies increasingly create and store large amounts of information in electronic form, access to and the understanding of that information plays an important role in everyday business operations. However, much of the information that is generated and stored by companies is in unstructured form that is not suitable for either conventional relational database operations or for on-line analytical processing ("OLAP"). The unstructured content (e.g., e-mails, word processing documents, images, faxes, text files, Web pages, etc.) do not have any meaningful measure by which they can be compared with each other or combined to automatically communicate trends and/or abstract and diverse concepts ("attributes") that may be present across a number of types and/or categories of content.

While some previous systems have attempted to classify and/or categorize unstructured content, such systems are generally rigid in nature and are not effective at measuring abstract and diverse concepts that span classifications and/or categories. Accordingly, there is a need for a measurement system or method for gleaning abstract and diverse concepts from unstructured content.

SUMMARY OF THE INVENTION

In one aspect of the present invention, the attribute scoring involves selecting a corpus of documents made up of unstructured content. Next, each of the documents is decomposed into subdocuments. These subdocuments may be any form of subdocument that can be measured for the desired attribute including but not limited to lines, pages, phrases, idioms, sentences, paragraphs, sections, chapters, volumes, articles, headings, verses, blocks of bits, etc. Once the document has been decomposed into subdocuments, then the determination is made to what extent, if any, each subdocument exhibits a feature or features associated with the attribute. Assuming that there is some feature associated with the attribute in the subdocument, then the subdocument is scored based on the weight of the feature presented in the subdocument. Once all the subdocuments have been examined, then the subdocument scores are aggregated to provide per document attribute scores. It is then possible to combine the document attribute scores for each document to produce a corpus attribute score.

In another aspect of the present invention, the feature or weights for determining attribute scores are determined ahead of time using machine learning techniques to determine to what extent a particular feature will be weighted as exhibiting an attribute. The machine learning process includes determining which features of interest in a corpus of training documents affect a document attribute score. This includes, identifying candidate features in the corpus of training documents as well as storing each candidate feature in association with the training document in which it occurs. The training documents are labeled with a value (e.g. positive or negative), such that each feature becomes associated with a document that is a positive or negative example for the attribute. Once the features have been associated with labeled document, it is possible to use machine learning to determine the weight each feature has to predict an attribute score. In one embodiment of the present invention, this process is biased towards efficient models as opposed to overly detailed models. Accordingly, one approach would be to estimate a logistic regression model of weights via "maximum likelihood" estimation and to validate the model using cross validation.

Another way in which the features may be weighted is by drawing a correlation between the frequency with which a feature appears within a single document and the frequency with which the feature appears in the corpus of documents. For example, if a feature is very common in one document but uncommon in all the other documents of the corpus, then that feature may be considered as having a large weight in illustrating to what extent that attribute is reflected in that document. However, if that feature is common throughout all the documents it would lessen the significance with which that document illustrates that particular attribute. Also, if a particular document did not exhibit a high frequency of a feature then the feature would be given a low weight under those circumstances as well.

As will be readily appreciated from the foregoing summary, the invention provides a new and improved method of scoring attributes for unstructured content in a way that allows for meaningful measurements of unstructured content, and a related system and computer-readable medium.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In the following detailed description, reference is made to the accompanying drawings which form a part hereof and which illustrate specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the scope of the present invention. The following detailed description is, therefore, not to be taken in a limiting sense and the scope of the present invention is defined only by the pending claims.

Figure 1:
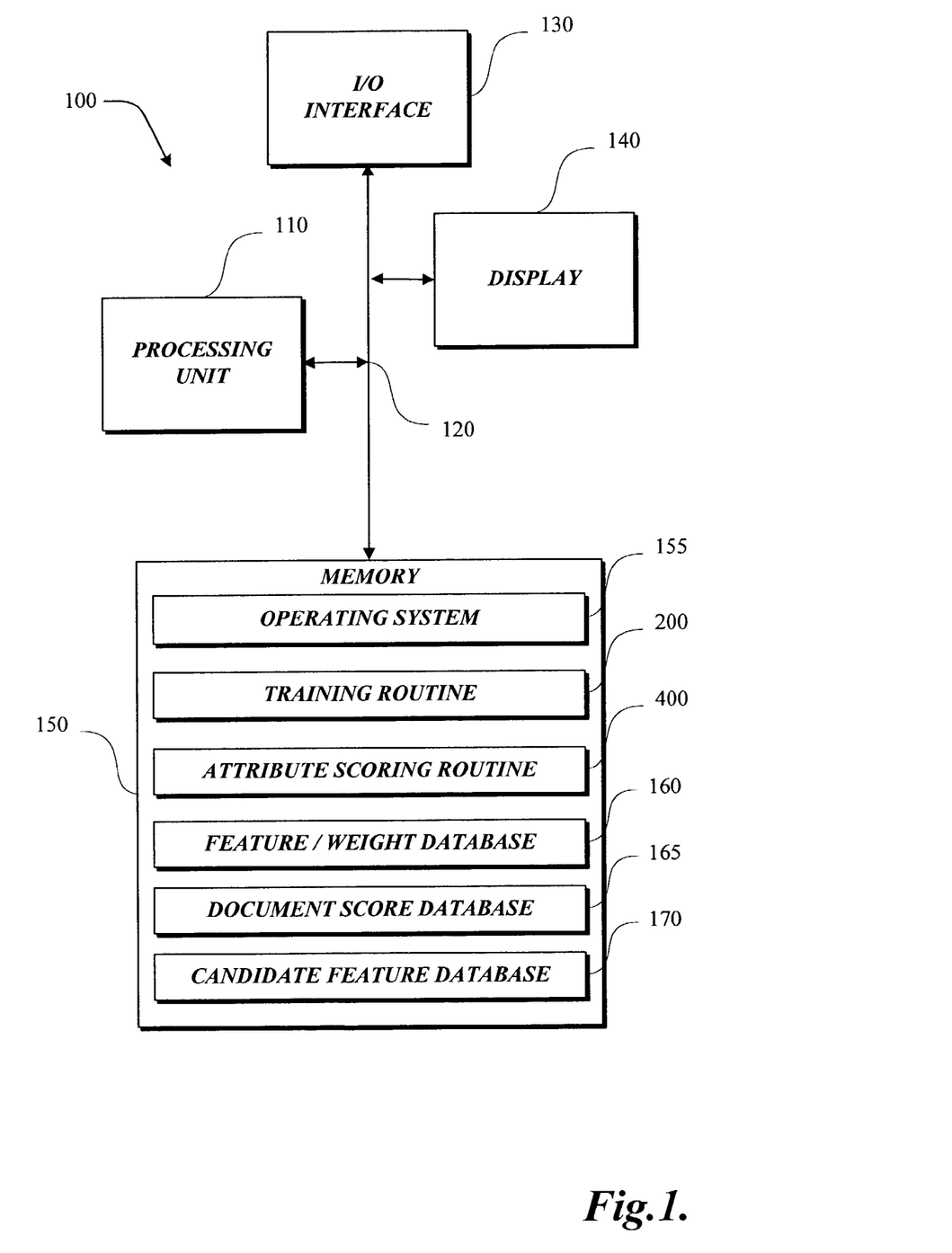
FIG. 1 is a block diagram of a suitable computer system environment in accordance with the present invention.

FIG. 1 depicts several key components of a computing device 100. Those of ordinary skill in the art will appreciate that the computing device 100 may include many more components than those shown in FIG. 1. However, it is not necessary that all of these generally conventional components be shown in order to disclose an enabling embodiment for practicing the present invention. As shown in FIG. 1, the computing device 100 includes an input/output ("I/O") interface 130 for connecting to other devices (not shown). Those of ordinary skill in the art will appreciate that the I/O interface 130 includes the necessary circuitry for such a connection, and is also constructed for use with the necessary protocols.

The computing device 100 also includes a processing unit 110, a display 140 and a memory 150 all interconnected along with the I/O interface 130 via a bus 120. The memory 150 generally comprises a random access memory ("RAM"), a read-only memory ("ROM") and a permanent mass storage device, such as a disk drive, tape drive, optical drive, floppy disk drive, or combination thereof. The memory 150 stores an operating system 155, a training routine 200, an attribute scoring routine 400, a feature/weight database 160, a document score database 165 and a candidate feature database 170. It will be appreciated that these software components may be loaded from a computer-readable medium into memory 150 of the computing device 100 using a drive mechanism (not shown) associated with the computer-readable medium, such as a floppy, tape or DVD/CD-ROM drive or via the I/O interface 130.

Although an exemplary computing device 100 has been described that generally conforms to a conventional general purpose computing device, those of ordinary skill in the art will appreciate that a computing device 100 may be any of a great number of devices capable of scoring attributes for unstructured content, including, but not limited to, database servers configured for information processing.

Figure 2:
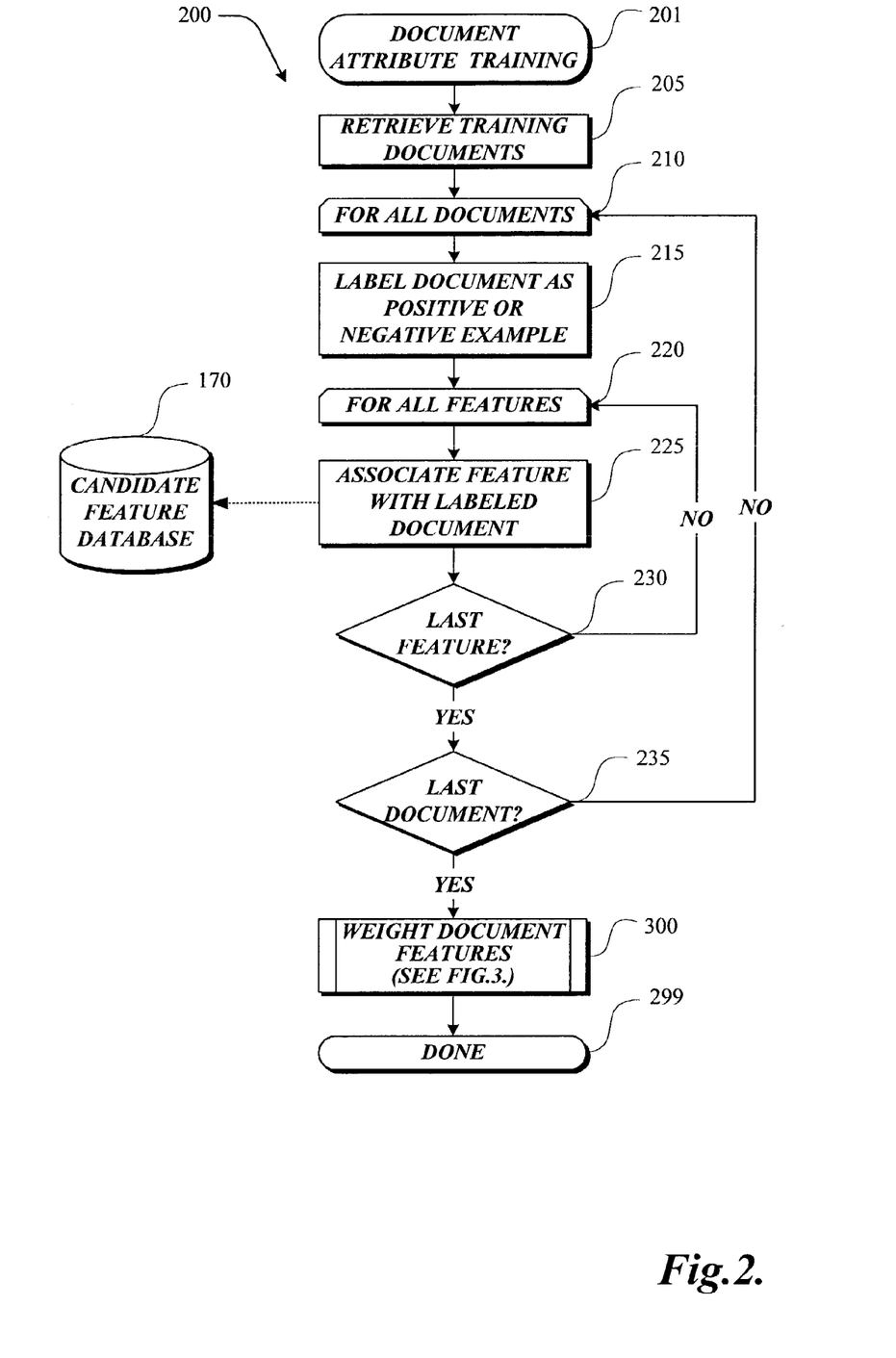
FIG. 2 is an overview flow diagram illustrating a machine learning routine for document attribute training in accordance with the present invention.

As illustrated in FIG. 1, the attribute scoring computing system 100 of the present invention is used to score unstructured content by attributes (e.g., abstract concepts such as sentiment, morale, threat level, interest, etc.). In order to determine attribute scores, it is first necessary to determine which features (word and non-word components of documents, such as words, phrases, idioms, punctuation, formatting, etc.) will affect a document's attribute score. Accordingly, in one exemplary embodiment of the present invention, a machine learning routine is used to "learn" which features are features that affect a document's attribute score. A flow chart illustrating a machine learning method of training features for use in the attribute scoring implemented by the computer system 100 is shown in FIG. 2. The document attribute training routine 200 begins in block 201 and proceeds to block 205 where a corpus of preselected training documents (i.e., documents that have been preselected for the purpose of training) that represent positive or negative examples of an attribute, possibly from a training document store (not shown).

Next, in block 210, an outer loop for processing all documents begins. Then inside the loop at block 215 a training document is labeled as either a positive or negative example for a desired attribute. For example, if the attribute being trained for is sentiment, then a document expressing poor sentiment(s) (e.g., sadness, anger, hopelessness, etc.) would be labeled as negative, thus allowing the routine to look for features that make it "negative." Conversely, if the document expressed favorable sentiments (e.g., happiness, hope, joy, etc.), it would be labeled as positive. Those skilled in the art will recognize that regardless of the type of attribute (e.g., sentiment, morale, threat level, etc.), the attribute can be characterized as positive or negative.

Once the document has been labeled positive or negative, an inner loop begins in block 220 to associate each feature (e.g., words, phrases, part of speech, patterns, punctuation, grammatical structures, punctuation, formatting, etc.) or combination of features (e.g., word and part of speech) with a labeled document and store the feature as a candidate feature (any identified feature) in a candidate feature database 170 in block 225. In other words, each feature within the document is associated with the label previously assigned to the document—either positive or negative. More generally the attribute scoring system could use document labels that are rated on some scale (e.g., a 5 point scale), or numerically scored (e.g., to be between zero and one). The feature with its positive or negative association to the document is then stored as a candidate feature. As will be described in more detail below, candidate features are used to "model" how the attribute (either a positive or negative example of the attribute) is represented in a document.

Once the last feature in a document has been stored as a candidate feature (at block 230), processing continues to block 235 where the outer loop returns to block 210 until the last training document has been labeled for the desired attribute. Once the last training document has been processed, the processing continues to subroutine block 300 where the candidate features are weighted to the extent subroutine 300 determines the feature illustrates the desired attribute. Subroutine 300 is described in greater detail below with reference to FIG. 3. The document attribute training routine 200 then ends at block 299. Once document attribute training is complete, the weighted features may be used to score other documents for the same features that were used in the training documents. Therefore, if the training documents exemplified sentiment, then future documents could be scored using the weighted features for sentiment from the training documents.

Figure 3:
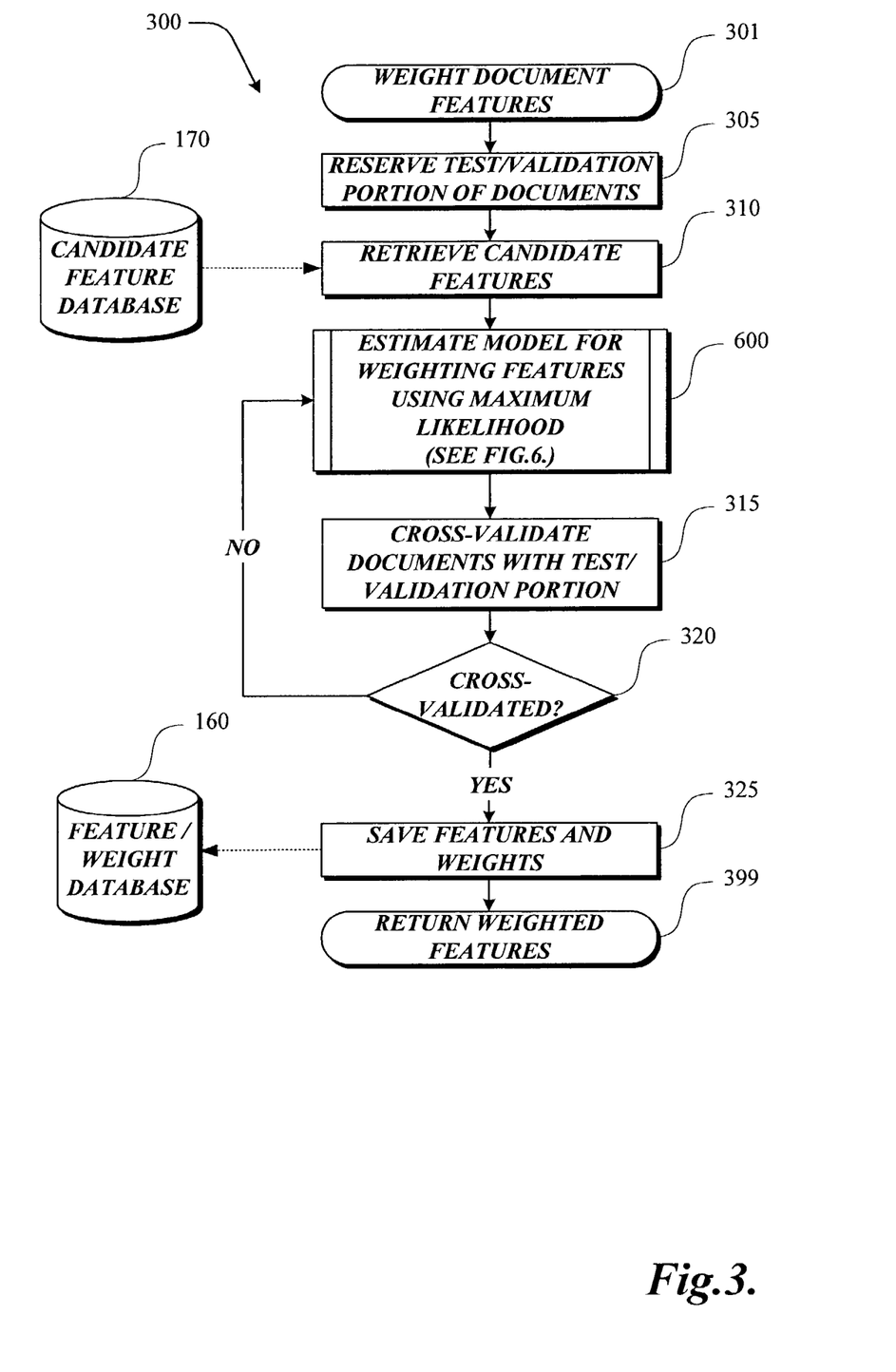
FIG. 3 is an overview flow diagram illustrating a subroutine for weighting document features in accordance with the present invention.

FIG. 3 illustrates a feature weighting subroutine 300. Subroutine 300 begins at block 301 and proceeds to block 305 where a portion of the training documents to be weighted are reserved as a test/validation portion of documents. Such a portion may include any amount of documents, but in one exemplary embodiment approximately one-half of the training documents are reserved as a test/validation portion of documents. Next, in block 310 the candidate features that were stored during document attribute training are retrieved from the candidate feature database 170. Next, in subroutine block 600 (described with regard to FIG. 6) the candidate features are used to estimate a model for weighting features associated with an attribute using the maximum likelihood method. At this time, the candidate features are weighted for the non-test/validation portion of documents. As will be described in more detail below, the features of the test/validation portion of documents will also be weighted and ultimately cross-validated against the weighted features from the non-test validation portion.

The maximum likelihood method is a general method of finding estimated (fitted) values of parameters. In accordance with the present invention, the maximum likelihood method estimates features and weights that "model" a desired attribute. As is well known by those skilled in the art, the maximum likelihood method finds estimated values of parameters such that where the joint likelihood function (i.e., the product of the values of a distribution function of each observed data value) is as large as possible. The estimation process involves considering the candidate features as constants and the weights as variables and then uses optimization to find the value of weights that maximize the likelihood function.

A variety of models may be estimated using the maximum likelihood method. For example, a linear regression model may be used to predict a continuous outcome or "attribute." For example, an individuals' height may be predicted from demographic information. Each individual, i, has a height denoted by $Y_i$, but in general $Y_i$ is not known for every individual. Each individual also has known values for other features, denoted as $X1_i$, $X2_i$, $X3_i$, etc., where, for example, $X1_i$ might be the age of individual i, $X2_i$ might be the sex, and $X3_i$ might be the income. Those features may then be assigned particular weights denoted as A, B1, B2, etc. that are estimated using the maximum likelihood function. A simple model that might posit a linear relationship between some weighted combination of features and the outcome of height is shown as follows:

$$Y_i = A + B1*X1_i + B2*X2_i + B3*X3_i \ldots$$

In order to make predictions on the height ($Y_i$) of a new individual, all that needs to be known is the values of the features ($X1_i$, $X2_i$, ...) for that individual and the values of the feature weights (A, B1, B2, ...) that are used to combine features into a prediction of height. A good interpretation of the weights is that they are an adjustment factor that converts changes in the features to changes in the outcome. Thus, if the outcome is height (measured in cm) and a feature is income (measured in thousands of dollars) with a weight of 0.3, then the interpretation is that a change of 1 (for 1000 dollars) indicates a change in 0.3×1=0.3 in height. One must be careful to note that increasing income does not *cause* an increase in height, but that on average taller people have higher incomes. Another way to think about the weights is that they are the factor by which one converts units (say from units of income to units of height). As noted above, this is called a linear regression model. Many factors like the distribution and variability of the outcome (attributes) and predictors (features) influence how the model is estimated. Thus, well known statistical methods are used to determine which of the features, i.e., the X variables, to include in the model (perhaps adding a feature like eye color is important or useless). As will be described in more detail below, a model for a desired attribute, such as linear regression model, is preselected and the parameters for the model (e.g., weights) are then estimated.

Now that a model from which weights for a continuous outcome has been described, prediction of a binary (on or off, 1 or 0) outcome or "attribute" will be discussed. A linear regression model is unlikely to be appropriate for a binary outcome because the linear regression outcomes are unlikely to be just 1 or 0. Rather, the linear regression outcomes typically fall within a range. Accordingly, a more useful method is to model the probability (or propensity) of the binary outcome. As a practical example, given a group of people, there is interest in predicting if they use private (personal vehicle) or alternate (car/van pool, bus, bicycle, walk) transportation to get to work. The outcome or "attribute" of interest (private or alternate transportation) is a binary outcome, having only two possible values. In addition it is assumed that demographic features (age, sex, age, income, education level, etc.) are available for everyone in the group, but that it is not known how they get to work.

Without any additional information it is difficult to make a prediction. However, if the transportation mode is known for a random sample of the people, that information, along with the demographic features can be used to build a model for predicting the transportation modality for the rest of the group. More specifically, the probability that an individual chooses to use an alternate form of transportation can be modeled. Thus, if $P(Y_i)$ is the probability that individual i uses alternate transportation, a model such as the following may be used:

$$P(Y_i) = A + B1*X1_i + B2*X2_i + B3*X3_i \ldots$$

For those individuals that get high probabilities, it is predicted that they use alternate transportation. For those with low probabilities, it is predicted they use private transportation. The exact cutoff between high and low probabilities depends on how the answer is to be used and the tolerance for certain kinds of risk. If it is important not to predict that someone uses alternate transportation modes when they really use a private vehicle, then the threshold might be set at 0.8 or 0.9. This sort of setting increases the risk of falsely predicting that some people use private vehicles when in fact they use alternate transportation.

It is possible that the predicted probabilities from the above model might be greater than 1 or less than 0. There is nothing obvious enforcing the constraint that probabilities must lie between 0 and 1. Of course, how or if this constraint is enforced depends on the how the model is estimated. One simple and common way of ensuring that the constraint is satisfied is to work in the logit scale. If P is a probability then $$\text{logit}(P) = \log(P/(1-P))$$

When P tends toward 0 then logit(P) tends toward negative infinity and when P tends toward 1, logit(P) tends toward positive infinity. In other words, any value (positive or negative) for logit(P) translates into a value of P between 0 and 1. With this additional feature, a logistic regression model may be written as:

$$\text{logit}(P(Y_i)) = A + B1*X1_i + B2*X2_i + B3*X3_i \ldots$$

One of ordinary skill in the art will appreciate that there are other transformations of $P(Y_i)$ which have similar properties to the logit (e.g., the probit transformation), but the logit formulation appears quite naturally when a binomial distribution for the outcomes is assumed, and the maximum likelihood estimation technique is considered. Therefore, if there exists a problem with a binary outcome (e.g., private or alternate transportation), a set of features for that outcome, and some individuals for whom the outcome is known, a logistic regression model can be developed that produces an outcome or attribute score (the logit, or equivalently the probability) for new individuals. That model can then be used on a set of training documents to estimate the weights and features that will ultimately be used to compute an attribute or outcome score from a new document or set of documents.

Figure 6:
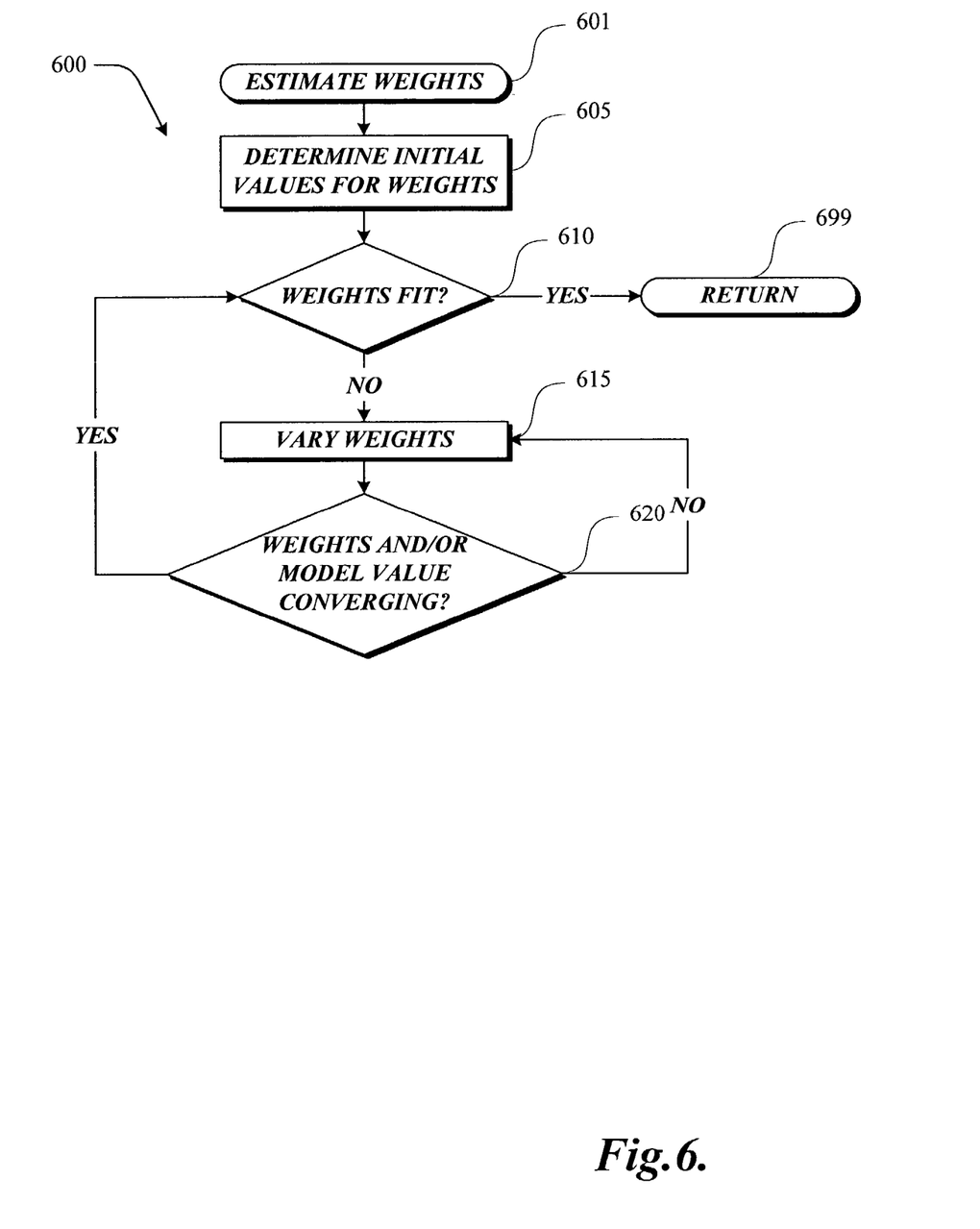
FIG. 6 is an overview flow diagram illustrating a subroutine for estimating weights of document features in accordance with the present invention.

Accordingly, in subroutine 600, using a predetermined model such as one of those described above, an initial set of weights for the candidate features for the non-test/validation portion of documents is estimated in block 605. In one embodiment of the present invention, the candidate features are estimated using the candidate feature frequency in each training document and in the corpus of training documents. Accordingly, features that occur more frequently in a document (document feature frequency), but are less common in the corpus (corpus feature frequency), may get more weight. Also, features affected by another feature in close proximity may also get more weight. For example, an exclamation point punctuation mark next to another feature such as a phrase may raise the weight of that feature. However, those skilled in the art will appreciate that a variety of methods may be used to estimate the initial weights for the candidate features, e.g., the method of least squares or nonlinear methods like decision trees or recursive partitioning.

Next, in a decision block 610, the initial features and weights are then tested for "fit" using well known methods in the art that assign the features and weights in a combination equation to determine if the results accurately predict the labeling of the training documents as either positive or negative. If so, the initial candidate features and weights from the non-test/validation portion of documents are returned in block 699 to the weighting routine 300 and cross-validated in block 315. Otherwise, the weights (i.e., parameters) of the model are varied using any suitable technique known in the art (e.g., Newton's method, conjugate gradient methods or cyclic ascent methods) in block 615. For example, Newton's method iterates through approximations of a "likelihood surface" where the highest "point" in the surface is chosen to estimate the parameters that define the surface. Processing continues back to decision block 620 where after successive iterations these approximations should tend to converge and the surface will "flatten." At each iteration the varied parameters are then tested in decision block 620 to see if the weights are converging (e.g., have the weights stopped significantly changing). If so, then the fit of the weights is tested again in decision block 610 to determine if they accurately predict the labeling of the training documents as either positive or negative. If they fit, then routine 600 returns in block 699 and the candidate features and estimated weights are cross-validated in block 315. Otherwise, the candidate features and weights are varied again in block 615 and perhaps a new maximization technique is used to vary the weights or new initial weighted features are determined. Regardless, blocks 610, 615 and 620 are repeated until an acceptable fit is achieved.

Returning to FIG. 3, once feature weights have been estimated and determined to have an acceptable fit, the candidate features and weights are cross-validated in block 315. When modeling a desired attribute, the most efficient models will be those with the best "fit," i.e., the model that most closely approximates the attribute being scored, while using the least number of features to do so. Over-fitting the model, e.g., using too many features to model the desired attribute, is undesirable as it will only decrease efficiency without providing a significant improvement in the measure of a desired attribute. By cross-validating, it is possible to detect over-fitting of model parameters and to then remove those candidate features that over-fit the model parameters, e.g., remove those candidate features with weights below a predetermined threshold.

In accordance with the present invention, cross-validation relies on using some portion of the non-test/validation portion of training documents to fit a model and the test/validation portion of the training documents to validate the estimated model. Random split cross-validation does this by selecting half the training documents to build a model, and using the other half to test the weights for the features. Accordingly, in block 315 the features and weights estimated from the preselected model, e.g., a logistic regression model, using the non-test/validation portion of documents are cross-validated against features and weights estimated using the reserved test/validation portion of documents. This entails running subroutine 600 with the test/validation portion of the documents that was reserved in block 305. If the cross-validation is successful as determined in decision block 320, i.e., if the features and weights estimated using the non-test/validation portion of documents are sufficiently similar to the features and weights estimated using the test/validation portion of training documents (as determined either by a predetermined threshold or an observer), then the routine proceeds to block 325. A failed cross-validation would indicate that further refinement of the features and/or weights may be necessary and the processing of the non-test/validation portion of training documents returns to subroutine 600 and is repeated with a looser or different model. Once the estimated weights and features are cross-validated, processing continues to block 325 where the features and weights that were successfully cross-validated are saved to a feature/weight database 160 for future attribute scoring in a new document or set of documents as learned features of an attribute. Routine 300 then returns to the calling routine at block 399 with the weighted features.

Most models (including regression models and tree-based models) have some internal check on how well the model's predictions fit the observed data (i.e., document labels in the present case). Mostly this is some generalization of the sum of squared differences between the observed and predicted observations. Call this the "measure of goodness of fit." If the measure of goodness of fit for the model on the non-test/validation documents that was used to estimate the model is about the same as the goodness of fit measure when the model is used for the test/validation documents, then there is considerable confidence that the model can be generally applied to even more unseen documents. If the goodness of fit measure on the test/validation documents is considerably worse, then that is a strong indication that the model is over-fit and adjustments are necessary. Generally this results in an (automatic) request to fit a slightly less complicated (and consequently worse fitting) model in the belief that this model will provide better weights. This is an iterative process that can continue be repeated many times. Accordingly, one of ordinary skill in the art will appreciate that this process may be repeated a number of times, accordingly these possible repetitions have not been shown in FIG. 3.

One of ordinary skill in the art will also appreciate that there are many ways to cross-validate. In some versions a model with similar functional form but different parameters (i.e., features and weights) is fit to each portion of the training documents and used to predict the other portion. In other variants, certain weighted features are selected to be excluded from the model. The model is built using the remaining weighted features and is then used to predict the excluded points. (That can obviously be quite computationally intensive as many models may need to be estimated.) Therefore, one aspect of using a cross-validation method in the present invention is to find a model whose predictive performance on the data that is used to estimate the model is the same as the model's predictive performance on data that was not used to estimate the model. In yet other embodiments, cross-validation is accomplished by determining weights for a portion of training documents and then applying those weights to a portion of test/validation documents that have not been used to estimate weights. Another method of cross-validation involves also determining weights for the features using the test/validation documents, then comparing the sets of weights. A still further cross-validation technique involves calculating weights for both test/validation and the remaining documents, but applying the weights of each portion to the other portion and determining if they each accurately predict the labels of the respective portions of the training documents.

Figure 4:
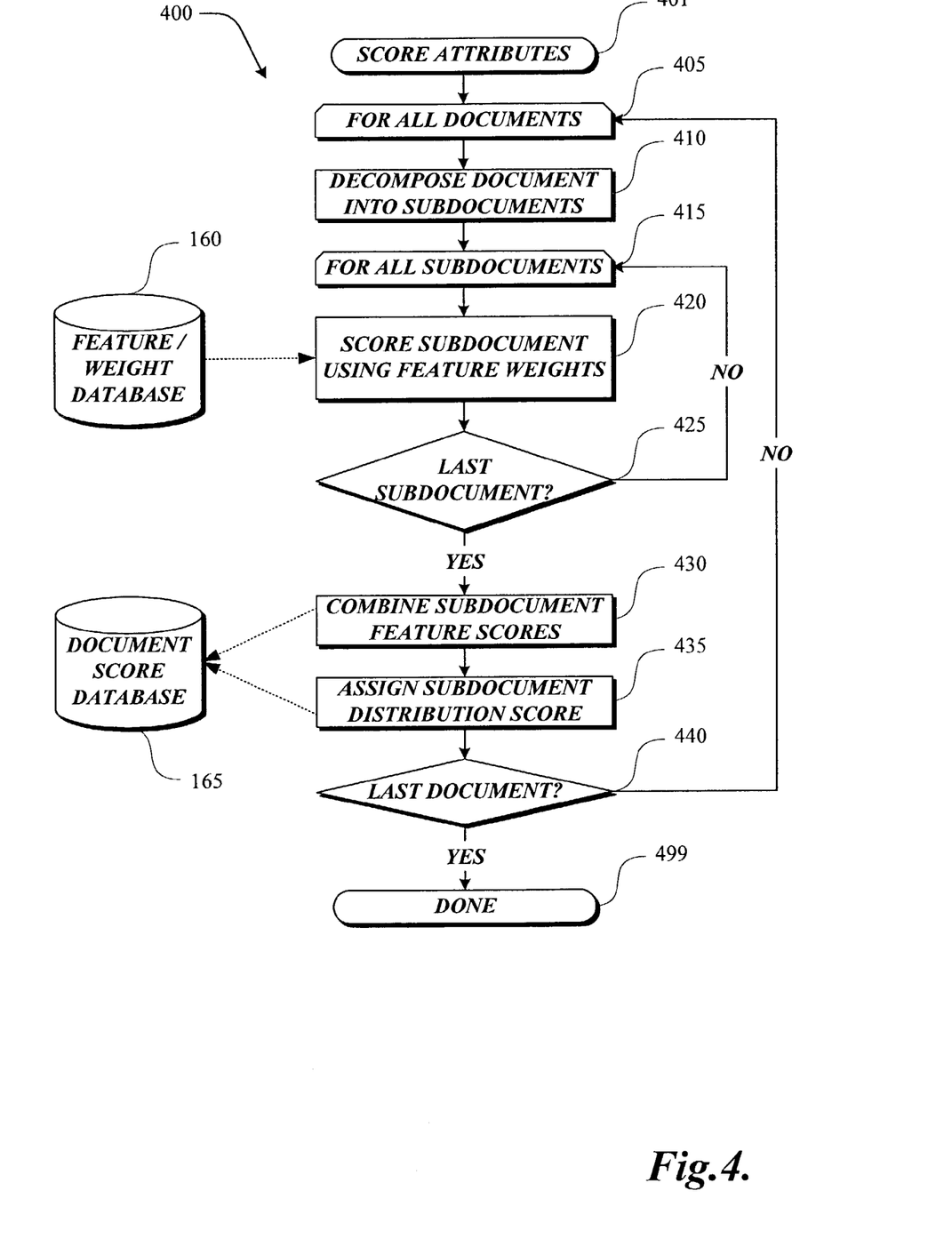
FIG. 4 is an overview flow diagram illustrating a routine for scoring attributes in accordance with the present invention.

Once a good set of features and weights has been determined such as from document attribute training routine 200, it is then possible to apply those weighted features when performing attribute scoring on similar sets of documents. Accordingly, FIG. 4 illustrates an attribute scoring routine 400 for applying weighted features to documents containing unstructured content. Routine 400 begins at block 401 and proceeds to block 405 which begins an outer loop that iterates through all the documents in a designated corpus of documents. Next, in block 410 a document is decomposed into component parts (e.g., subdocuments). In one embodiment, the document is decomposed into sentences. However, as one skilled in the art will recognize, many other types of techniques of decomposition may be used when decomposing or parsing documents into subdocuments. For example, documents may be decomposed into topically related sections, lines, pages, phrases, idioms, sentences, paragraphs, sections, chapters, volumes, articles, headings, verses, etc. Documents could also be decomposed arbitrarily, e.g., into subdocuments or blocks having a predetermined (equal or unequal) number of bits or bytes. Next, at block 415 an inner loop begins that iterates through all subdocuments of the decomposed document. Next, in block 420 a subdocument is scored using the feature weights retrieved from the feature/weight database 160.

Scoring for an attribute is accomplished by aggregating the weights of features in the subdocument that match features for the attribute from the feature/weight database 160. For example, individual features and weights can be combined (aggregated) in a linear fashion, as the following linear regression model indicates:

$$\text{Subdocument}_n \text{ score} = w_1 f_1 + w_2 f_2 + \ldots w_k f_k$$

with $w_k$=weight of feature k $f_k$=1 if feature found in the subdocument, else 0

In a similar scenario to those listed above, suppose one is attempting to assess the sentiment (i.e., the desired attribute) of a collection of email messages (i.e., a corpus of documents). One may try to assess one particular emotion using a happy-sad axis. For each document (e.g., email message) there are many features that can be identified, but for the sake of the example assume that only two features are available, e.g., X1 is the proportion of words in the document which are expletives and X2 is the proportion of words and phrases that are synonyms for happy (e.g., be cheerful; have the mind at ease, smile, put a good face upon, etc.). Further, suppose that a collection of training documents has already been scored as either happy or sad. Using the training documents, the following logistic regression model may be used to predict happiness:

$$\text{logit}(P(\text{happy})) = 0 + -0.5 * X1 + 0.2 * X2$$

This model says that the logit (or attribute score) decreases as the proportion of expletives (X1) increases and increases (by smaller amount) as the proportion of happy phrases (X2) increases. This model might predict the training data very well (that is produce very high scores for all the happy emails and very low scores for the sad emails) or it might be a poor predictor (meaning that the value of the score has little relationship to the sentiment of the messages). If the model is good, the entire collection of emails may be scored and the average attribute score of the messages evaluated. If the average attribute score is high, then on average the correspondents are happy. Further, if emails received in a prior week are compared with emails received in the current week, the average attribute score might change (statistically significantly), thus indicating a change in sentiment.

Although linear regression models are described above, the present invention may also use non-linear regression models (to either score the attribute or estimate the weights and features as described above). More specifically, predictors (or features) can be combined in non-linear ways as shown by the following model:

$$A + B1 * \exp(X1_i/X2_i) + (B2*X2_i)/(B3*X3_i) \ldots$$

Another class of models that can be used by the present invention for both weight estimation and attribute scoring are the tree-based or recursive partitioning models. Where feature regression-like models aim to produce a single prediction equation, the tree-based models try to produce a decision tree, e.g., "If this person is older than 60 and a female and has only a high school education then they use alternate transportation. If this person is older than 60 and a female and has greater than high school education then they use private transportation. If this person is female and under 60 and has an advanced degree, they use alternate transportation. All others use private transportation."

These models are inherently nonlinear and very powerful. There are several different styles of implementation. Two broad possible types of models are those similar to the CART algorithm (described in the book *Classification and Regression Trees* by Breiman, Friedman, Olshen and Stone, published by Wadsworth Inc, 1984), and models similar to the C4.5 algorithm, (described in the book *C4.5, Programs for Machine Learning* by J. R. Quinlan, published by Morgan Kaufmann, 1993).

Using a preselected model of any of the types above, a subdocument score is computed for each subdocument as block 420 is repeated until the last subdocument is reached as determined in block 425. Next, in block 430 the subdocument feature scores are combined to produce a document attribute score that is stored in the document score database 165. In one embodiment of the present invention, the subdocument feature scores are combined by averaging them together. However, those skilled in the art will recognize that the subdocument features could be combined using one or a combination of a myriad of methods, including but not limited to summing, normalizing, maximizing, minimizing, etc.

Next, in block 435 a subdocument supplemental score may also be generated and stored in the document score database 165. The subdocument supplemental score may be one or more additional scores such as a maximum, minimum, or other statistical measure that relates to particular features or characteristics of the subdocuments within the document. For example, if a particular feature is of interest merely because it was mentioned, then it may be saved here as a subdocument supplemental score as opposed to being combined with other subdocument scores to produce an overall document score. Multiple measures, for example the max, min, or sum measures from the previous example, may be used differentially to support a variety of purposes. The measures may be used in existing descriptive or predictive models, such as a model used to predict customer attrition. The total or sum measure may be used for such purposes. Another use of the measures are for business triggers. For example, the max measure, which would be more sensitive in most cases than the sum measure, could be used to automatically escalate a customer contact to a supervisor.

The variety of measures provide a flexible mechanism for quantifying attributes for specific purposes. Document attribute scores are thus generated for each document until the last document has been processed as determined in decision block 440. At which point the attribute scoring routine 400 ends at block 499.

Routine 400 may be better understood with reference to an exemplary model situation. Suppose the following illustrative document represents customer feedback to an electronics retailer:

"Customer was upset. TV he purchased was missing a remote. He wanted to speak to a supervisor."

This single document is initially decomposed into three subdocuments based on sentence breaks:

Subdocument 1="Customer was upset"
Subdocument 2="TV he purchased was missing a remote"
Subdocument 3="He wanted to speak to a supervisor"

The next step involves scoring each of the three subdocuments, and this involves locating the weighted features each subdocument. To continue with the hypothetical example, subdocument one has the following features with associated weights:

Customer/$f_7$=1, $w_7$=0.3
Upset/$f_{22}$=1, $w_{22}$=0.8
fall$_{all\_other}$=0

The subdocument score becomes

Subdocument$_1$ score=$w_7 f_{17}+w_{22}f_{22}$=0.3*1+0.8*1=1.1

The next two subdocuments are similarly scored. For the sake of the example, the hypothetical scores for subdocuments two and three are 0.0 and 0.3 respectively. The set of subdocument scores for the example document is then Subdocument score set={1.1, 0.0, 0.3}

Again hypothetically, since the documents were scored for negative sentiment, and since negative customer sentiment may have serious negative consequences for the business, the max operator is applied to the score set to determine the final score of the document.

Document score=max(subdocument scores)=max{1.1, 0.0, 0.4}=1.1

In this example, a total or sum operator could also have been used, with the effect that granularity would be lost, while a more faithful summarization of the negative sentiment would have been gained. Accordingly, a supplemental score might be:

Supplemental score=mean{1.1, 0.0, 0.4}=0.5

Different needs are supported by different operators on the set of subdocument scores.

In one exemplary embodiment of the present invention, the analogy between subdocuments and documents may be expanded to a corpus, such that the document scores may be combined, much like the subdocument scores, to produce a corpus attribute score.

Figure 5:
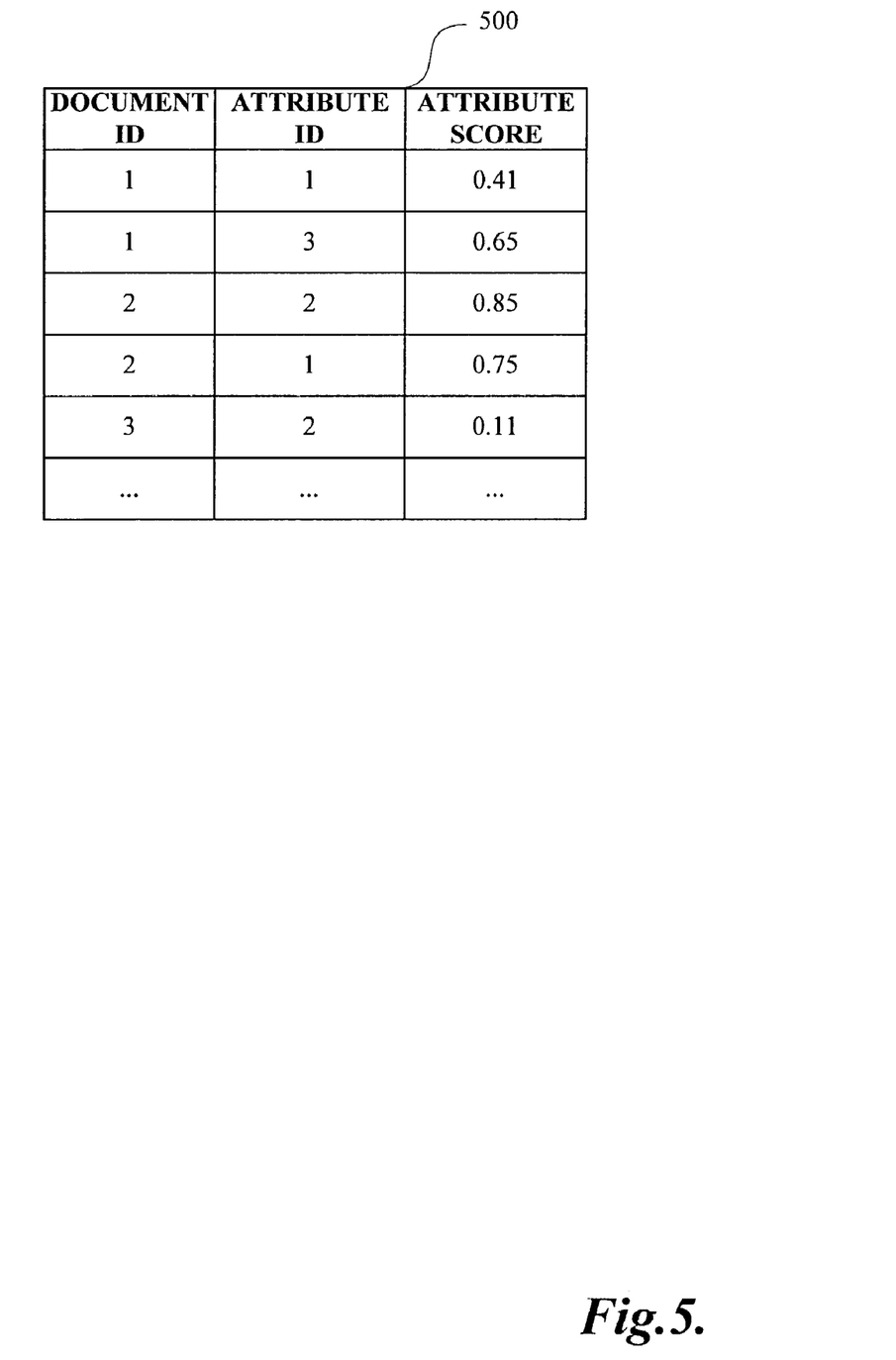
FIG. 5 is an exemplary view of a sample data structure for presenting attributes and scores.

FIG. 5 illustrates a simplified sample of document attribute scoring table 500 formed in accordance with the present invention as one exemplary format in which data may be stored in the document score database 165. For example, for document ID 1 and attribute ID 1 there is an attribute score of 0.41. And for document ID 1 with attribute ID 3 there is an attribute score of 0.65. For document ID 2 with attribute ID 2 there is an attribute score of 0.85. Note that for document ID 1 there is no score for attribute ID 2 and similarly for document ID 2 there is no attribute score for attribute ID 1. Accordingly, it can be inferred that for document ID 1, attribute ID 2 was not present and for document ID 2, attribute ID 1 was not present. By using multiple attribute scores with a large collection of documents, it is possible to further refine the abstract and diverse concepts that may be present across the corpus of documents.

The present invention may be used in a myriad of computing applications in which unstructured content is measured to allow for further processing in a meaningful manner. For example, in copending U.S. patent application Ser. No. 10/241,981 filed concurrently herewith on Sep. 11, 2002 and entitled TEXTUAL ON-LINE ANALYTICAL PROCESSING METHOD AND SYSTEM (attorney docket number IRES-1-18928), which is hereby incorporated by reference, the attribute scoring of the present invention may be used for OLAP processing of unstructured documents.

While the preferred embodiment of the invention has been illustrated and described, it will be appreciated that various changes can be made therein without departing from the spirit and scope of the invention. For example, the attribute scores used in the present invention may be any statistical measure that may assist in determining meaning across a corpus of documents. Accordingly, such measures as minimum, maximum, mean, median, mode, standard deviation, sums, range, variance, sample mean, sample variance, standard error and CHI square may be used when measuring attribute scores. Additionally, such attribute scores may be normalized across different types and/or sizes of documents to provide a meaningful comparison between such documents.

The embodiments of the invention in which an exclusive property or privilege is claimed are defined as follows:

1. A computer implemented method for scoring of an attribute exhibited in a corpus of unstructured documents, the method comprising:
   storing a plurality of scoring models, each of the scoring models associated with a different method of combining subdocument scores for a document, wherein the plurality of scoring models comprises:
      a first scoring model for determining an average degree to which the attribute is present in the document;
      a second scoring model for determining a maximum degree to which the attribute is present in the document;
      a third scoring model for determining a total degree to which the attribute is present in the document; and
      a fourth scoring model for determining an amount of change in the attribute in the subdocuments of the document over a period of time;
   decomposing each unstructured document into subdocuments;
   determining an attribute score for each subdocument in the corpus corresponding to the level said subdocument exhibits a feature associated with the attribute; and
   combining subdocument attribute scores for each document to produce a document attribute score, further comprising:
      selecting a scoring model for scoring the documents; and
      for each document, determining a document attribute score for the document by applying the selected scoring model to the subdocument scores of the subdocuments of the document.

2. The method of claim 1, further comprising combining the document attribute scores for each document to produce a corpus attribute score.

3. The method of claim 1, further comprising determining which features of interest in said corpus of unstructured documents affect the document attribute score.

4. The method of claim 3, wherein determining which features of interest affect the document attribute score comprises:
 identifying candidate features in a corpus of training documents; and
 storing each candidate feature in association with the training document in which it occurs.

5. The method of claim 1, wherein the attribute is a sentiment expressed within the document.

6. The method of claim 1, wherein at least one unstructured document comprises a plurality of subdocuments, each subdocument created independently and separately of the other subdocuments over a period of time.

7. The method of claim 1, wherein determining each subdocument's attribute score comprises determining if any weighted features are present in each subdocument.

8. The method of claim 7, wherein each subdocument's attribute score corresponds to a combination of values of weighted features.

9. A computer implemented method for scoring of an attribute exhibited in a corpus of unstructured documents, the method comprising:
 storing a plurality of scoring models, each of the scoring models associated with a different method of combining subdocument scores for a document;
 for each of a plurality of information needs, associating the information need with one of the scoring models for determining a document attribute score from the subdocument attribute scores of the subdocuments of the document, wherein the information needs comprise:
  determining an average degree to which the attribute is present in the document;
  determining a maximum degree to which the attribute is present in the document;
  determining a total degree to which the attribute is present in the document; and
  determining an amount of change in the attribute in the subdocuments of the document over a period of time;
 decomposing each unstructured document into subdocuments;
 determining an attribute score for each subdocument in the corpus corresponding to the level the subdocument exhibits a feature associated with the attribute; and
 combining subdocument attribute scores for each document to produce a document attribute score, wherein combining subdocument attribute scores for each document to produce a document attribute score, further comprising:
  determining a current information need with respect to the attribute; and
  for each document, applying the scoring model associated with the current information need to the subdocument attribute scores of the document to determine the document attribute score.

10. A computer readable medium containing computer readable instructions executable by a processor for scoring of an attribute exhibited in a corpus of unstructured documents, the computer readable instructions comprising:
 a training component for determining weights of features are associated with the attribute;
 an attribute scoring component for determining attribute scores by:
  decomposing each unstructured document into subdocuments;
  determining an attribute score for each subdocument in said corpus in response to the weights of features associated with the attribute and present in the subdocument; and
 a document scoring component for combining the subdocument attribute scores for each document to produce a document attribute score, the document scoring component including for each of a plurality of information needs, a scoring model for determining the document attribute score from the subdocument attribute scores of the subdocuments of the document, wherein the information needs comprise:
  determining an average degree to which the attribute is present in the document;
  determining a maximum degree to which the attribute is present in the document;
  determining a total degree to which the attribute is present in the document; and
  determining an amount of change in the attribute in the subdocuments of the document over a period of time.

11. The computer readable medium of claim 10, further comprising:
 a corpus scoring component for combining the document attribute scores for each document to produce a corpus attribute score.

12. The computer readable medium of claim 10, wherein the training component is further adapted for determining which features of interest in said corpus of unstructured documents affect the document attribute score.

13. The computer readable medium of claim 12, wherein the training component is adapted to determine which features of interest affect the document attribute score by:
 identifying training features in a corpus of training documents; and
 storing each training feature in association with the training document in which it occurs.

14. The computer readable medium of claim 10, wherein the attribute scoring component is adapted to determine each subdocument's attribute score by determining if any weighted features are exhibited by each subdocument.

15. The computer readable medium of claim 14, wherein each subdocument's attribute score corresponds to a combination of values of weighted features.

16. A computer implemented method for scoring a document with respect to an attribute, the method comprising:
 identifying a plurality of subdocuments which comprise the document;
 for each subdocument, determining a subdocument score as a function of features of the subdocument that match features associated with the attribute, to produce a plurality of subdocument scores for the document;
 providing a plurality of scoring models, wherein each scoring model is associated with a different method of combining the subdocument scores and wherein each scoring model is associated with an information need, the scoring models comprising:
  a first scoring model for determining an average degree to which the attribute is present in the document;
  a second scoring model for determining a maximum degree to which the attribute is present in the document;
  a third scoring model for determining a total degree to which the attribute is present in the document; and
  a fourth scoring model for determining an amount of change in the attribute in the subdocuments of the document over a period of time;

selecting one of the scoring models by determining a current information need, and selecting the scoring model associated with the current information need; and determining a document score for the document using by applying the selected scoring model to the subdocument scores of the subdocuments.

17. A computer implemented method for scoring a document with respect to an attribute, the method comprising:

identifying a plurality of subdocuments which comprise the document;

for each subdocument, determining a subdocument score as a function of features of the subdocument that match features associated with the attribute, to produce a plurality of subdocument scores for the document;

providing a plurality of scoring models, wherein each scoring model is associated with a different method of combining the subdocument scores and wherein each scoring model is associated with an information need, the scoring models comprising:

a first scoring model for determining an average degree to which the attribute is present in the document;

a second scoring model for determining a maximum degree to which the attribute is present in the document;

a third scoring model for determining a total degree to which the attribute is present in the document; and a fourth scoring model for determining an amount of change in the attribute in the subdocuments of the document over a period of time;

selecting one of the scoring models; and determining a document score for the document using by applying the selected scoring model to the subdocument scores of the subdocuments.

18. The computer implemented method of claim 17, wherein the attribute is a sentiment expressed within the subdocuments.

19. The computer implemented method of claim 17, wherein the subdocuments that comprise the document are each created independently and separately of the other subdocuments over a period of time.

* * * * *